Nov. 25, 1930.   M. GORHAM   1,783,148
ROLLER MILL GUIDE
Filed May 7, 1928   2 Sheets-Sheet 2
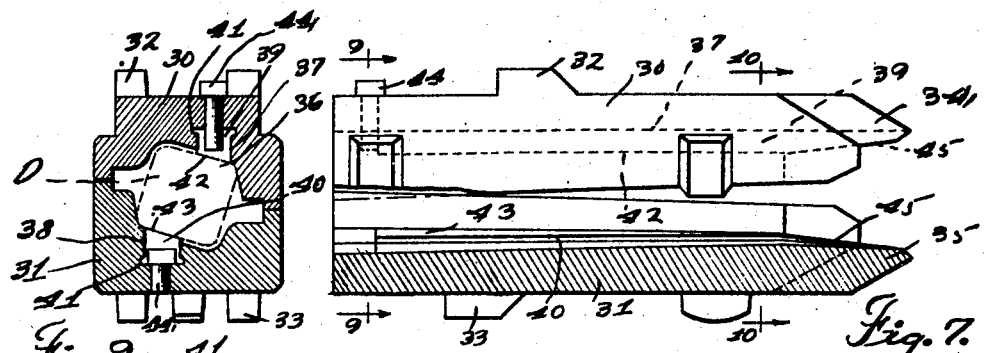
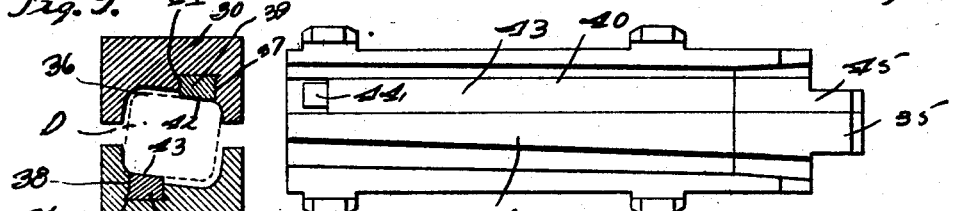
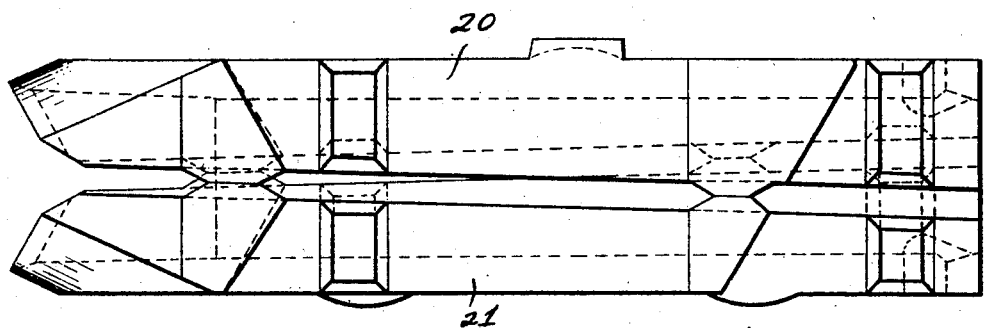
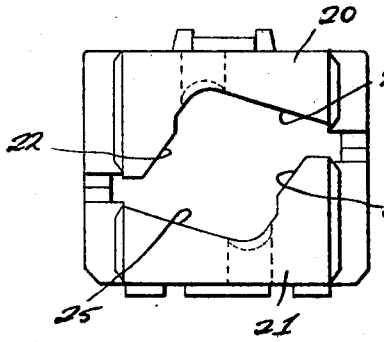
Inventor
Marvine Gorham Patented Nov. 25, 1930

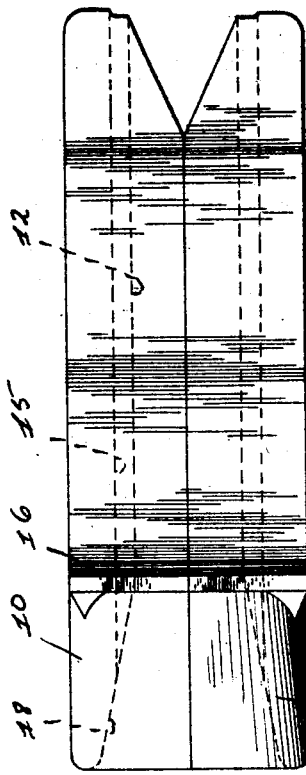

1,783,148

UNITED STATES PATENT OFFICE

MARVINE GORHAM, OF BUFFALO, NEW YORK, ASSIGNOR TO MICHIGAN STEEL CASTING COMPANY, OF DETROIT, MICHIGAN, A CORPORATION OF MICHIGAN

ROLLER-MILL GUIDE

Application filed May 7, 1928. Serial No. 275,934.

The invention relates to improvements in rolling mill guides and the like. Such guides are used in connection with rolling mills for guiding the material into the proper position to enter the rolls or for stripping the material from the rolls, and are also commonly used for twisting the material between successive passes through the rolls.

Rolling mill guides are subjected to severe stresses, but particularly to surface wear at certain portions where the material is guided by the same, and it has therefore been the usual practice to construct the guides of chilled cast iron in order that a hard surface might be provided.

Chilled cast iron is rather difficult to machine due to the hardness of the metal but it has been utilized for rolling mill guides because it was thought that the hardness was necessary in order to obtain the maximum life for the guides. However, in spite of the fact that a material of more than ordinary hardness has been used the rolling mill guides constructed of this material have not had a great length of life and it has been found necessary to frequently replace worn out guides with new ones, which not only involves the additional expense of the new guide but also the much larger cost incident to the stopping of production while exchanging the guides.

The object of my invention is to increase the length of life of rolling mill guides by constructing the same of an alloy which is particularly adaptable for the conditions under which the guide must function. I have discovered that rolling mill guides constructed of a chromium nickel iron alloy of a certain composition will greatly outwear guides made of materials heretofore thought most desirable for the purpose. Furthermore, the alloy which I employ is one that lends itself readily to commercial manufacturing methods, that is, it can be cast into the forms found by experience to be most desirable for rolling mill guides, possesses the necessary strength and toughness and it is capable of being machined.

Peculiarly the alloy which I have found most desirable would not at first appear to be as suitable as those heretofore used because the hardness of the metal is less than that of materials heretofore utilized. Nevertheless, the test of actual experience has shown that guides constructed of the alloy which I have suggested will greatly outlast those made of other materials having a greater hardness as determined by ordinary methods of hardness testing.

In the preferred embodiment of my invention the rolling mill guides are constructed of an alloy containing 35% nickel, 15% chromium and the balance principally iron. It has been found desirable to maintain the proportions of the ingredients within fairly narrow limits in order to obtain the maximum wear-resisting properties of the metal under conditions of the operation of rolling mill guides. As an example of desirable range of composition, the following table gives the upper and lower limits for commercially obtaining the best results:

| | | |
|---|---|---|
| Nickel | 32 to 38 | % |
| Chromium | 13 to 17 | % |
| Carbon | 0.35 to 0.65 | % |
| Silicon | 0.9 to 1.4 | % |
| Manganese | 0.85 to 0.95 | % |
| Iron | Balance. | |

It is to be understood that other substances such as sulphur and phosporus may be present in the composition in relatively small amounts, these ingredients being preferably kept low in accordance with good foundry practice.

It is probable that the reason for the increased length of life of rolling mill guides constructed of the alloy above set forth is that this alloy has the property of extreme hardness at elevated temperatures, whereas the alloys heretofore used for the same purpose while being harder at ordinary temperatures were less hard at the higher temperatures. It is believed that the alloy indicated above possesses to an extraordinary degree the property of extreme resistance to wear at elevated temperatures, whereas other alloys in which the composition is materially varied from the above do not possess this property to the same degree.

Under practical conditions of operation the rolling mill guides are subjected to high temperature conditions, at least on the wearing surfaces because the bars or billets that are passed through the guides to the rolls are heated to high temperatures. Therefore a material which is resistant to wear under such conditions is desirable and I have discovered that the nickel chromium iron alloy outlined above is peculiarly adapted for this purpose.

The particular mechanical construction of the rolling mill guide does not form the subject matter of this invention, but in order to indicate some of the many embodiments of the invention I have illustrated in the accompanying drawings several different types of rolling mill guides.

Figure 1 represents a longitudinal section through one form of rolling mill guide embodying my invention;

Figure 2 is a plan view thereof;

Figure 3 is an end view thereof;

Figure 4 is a side elevational view of a so-called twist delivery guide;

Figure 5 is an end view thereof;

Figure 6 is a view of the opposite end thereof;

Figure 7 illustrates a modified form of guide having replaceable wearing portions;

Figure 8 is a top plan view of the lower half of the guide;

Figure 9 is a cross section on the line 9—9 of Figure 7;

Figure 10 is a cross section on the line 10—10 of Figure 7.

As heretofore stated, my invention can be embodied in rolling mill guides of many different constructions such, for example, as straight guides, turnover guides, twist guides, etc. In Figures 1 to 3 there is illustrated one form of straight guide formed of two complementary cast sections 10 and 11 adapted to be inserted within a suitable holding means C which in turn is arranged in fixed relation with the rolls A and B of the rolling mill. Each casting has a longitudinally extending recess or channel 12 therein, which in the construction illustrated in Figure 3 is bounded by the surfaces 13 and 14 arranged at a predetermined angle with respect to each other. At the base of each channel there is a deeper recess 15, which in the present instance is designed to provide clearance for the corners of a square bar when fed through the guide. The outer surface of each casting 10 and 11 is formed with a shoulder 16 adapted to engage the holding means C to locate the guide with respect to the rolls. The forward end of the guide is tapered at 17 forming guiding portions which extend between the rolls A and B leaving only a small clearance. The other end of the guide is provided with an enlarged flaring entrance 18.

Figures 4 to 7 inclusive illustrate a modified form of rolling mill guide, generally termed a twist delivery guide. As illustrated, this guide is constructed from two complementary castings 20 and 21 having channels therein bounded by the surfaces 22, 23, 24 and 25. These surfaces form the guides for engaging the sides of the bar or billet passed through the guide and are so arranged as to impart a twist to the bar as it progresses through the guide. By comparing Figures 5 and 6 which represent the opposite ends of the guide it will be observed that the surfaces 22, 23, 24 and 25 are arranged in a different angular relationship at each end. Thus a bar or billet guided by these surfaces will be angularly turned through a predetermined amount upon passing through the guide. The surfaces are subjected to extreme wear at elevated temperatures due to the combined effects of the twisting action and the high temperature of the material passing through the guide.

In carrying out my invention with the types of guides thus far described, the complementary castings are constructed of the nickel chromium iron alloy mentioned above. The alloy thus forms the body of the guide and also the wearing surfaces thereof.

Figures 7 to 10 illustrate a modified form of rolling mill guide to which my invention is applicable. In this construction the surfaces exposed to the greatest wear are made of separate parts which may be inserted in the main body of the guide and exchanged for other parts when they become unduly worn. As illustrated, the guide is composed of two complementary members 30 and 31, the outer faces of which are provided with suitable lugs or extensions 32 and 33 adapted to cooperate with suitable holding means. 34 and 35 represent tapering end portions adapted to extend into close proximity to the rolls in order to serve for stripping the material coming from the rolls. While the guide may be constructed for any desired shape of bar or billet, the one illustrated is designed to cooperate with a substantially rectangular bar D and is adapted to twist the said bar through a predetermined angle as the bar is advanced throughout the length of the guide. Each of the guide members 30 and 31 is provided with a channel-shaped recess 36 and with suitable grooves 37 and 38 extending longitudinally of the recess. 39 and 40 are guiding strips removably engaging the grooves 37 and 38 respectively and preferably formed with flanges 41 having a dove-tailed engagement with said grooves. The bearing strips have their outer surfaces 42 and 43 twisted in such a manner as to impart the desired angular twist to the bar as it is advanced through the guide. These strips preferably extend from the tapering ends 34 and 35 to the outlet ends of the guide.

In the construction shown the guiding strips are inserted into the grooves by sliding the same longitudinally from the tapering end portion of each guiding member toward the opposite end and to position the guiding strips suitable stops are provided, such as the bolts 44 which extend through the guiding members and project into the grooves. The portions of the guiding strips adjacent the rolls are provided with inclined or tapering faces 45 for guiding the material in the direction in which it is to pass through the guide. These faces also serve to strip the material from the rolls.

In carrying out my invention with the structure as illustrated in Figures 7 to 10 inclusive, the guiding strips 39 and 40 are composed of the nickel chromium iron alloy previously described and the guiding members 30 and 31 into which the strips are inserted are composed of any suitable material which may or may not be the same in composition as the guiding strips.

While in the foregoing description I have referred to several specific types of rolling mill guides, it is to be understood that my invention in its broader aspects contemplates any type of rolling mill guide subjected to conditions found in rolling mill practice and constructed of the material outlined above. By reason of my invention it is possible to greatly extend the life of rolling mill guides and to increase the efficiency of the rolling mill.

What I claim as my invention is:

1. A rolling mill guide having the guiding portions composed of an alloy containing approximately 15% chromium, 35% nickel and the balance principally of iron, said alloy having the property of resisting wear at elevated temperatures.

2. A rolling mill guide having exchangeable guiding portions arranged at the points subjected to the greatest wear, said guiding portions being composed of an alloy containing approximately 15% chromium, 35% nickel and the balance principally of iron.

3. A rolling mill guide having a longitudinal recess therein, guiding portions extending lengthwise of said guide and formed to impart a twist to the material being rolled, said guiding portions being composed of an alloy containing approximately 15% chromium, 35% nickel and the balance principally of iron.

4. A rolling mill guide comprising a casting containing a longitudinal recess therein and a separate guide secured in said recess and composed of an alloy containing approximately 15% chromium, 35% nickel and the balance principally of iron.

5. A rolling mill guide adapted to be subjected to the wear of highly heated bars and billets as they are being rolled, said guide having the guiding portions thereof composed of an alloy adapted to resist wear at elevated temperatures, said alloy being of approximately the following composition:

| | |
|---|---|
| Nickel | 32 to 38 % |
| Chromium | 13 to 17 % |
| Carbon | 0.35 to 0.65% |
| Silicon | 0.9 to 1.4 % |
| Manganese | 0.85 to 0.95% |
| Iron | Balance. |

6. A rolling mill guide having the guiding portions composed of an alloy comprising as principal ingredients chromium, nickel and iron, the iron being present in larger amounts than either the nickel or the chromium, said alloy containing sufficient amounts of chromium and nickel to impart the property of resisting wear at elevated temperatures.

In testimony whereof I affix my signature.

MARVINE GORHAM.